2,862,911
ALKYL VINYL KETONE-STYRENE COPOLYMER HYDROXYLATED BY REDUCING CARBONYL GROUP

Joseph A. Blanchette, East Longmeadow, Mass., assignor to Monsanto Chemical Company, St. Louis, Mo., a corporation of Delaware No Drawing. Application September 19, 1956
Serial No. 610,703

5 Claims. (Cl. 260—63)

This invention relates to new copolymers of monovinylidene aromatic compounds. More particularly, the invention relates to reduced copolymers of monovinylidene aromatic compounds and alkyl vinyl ketones.

In many applications it is necessary or desirable that a polymer contain reactive groups. In the case of styrene polymers and the like, it is often particularly desirable that these reactive groups be substituted on the backbone of the polymer molecule rather than on the phenyl nuclei, e. g., in coating compositions, where the presence of the reactive groups on the backbone imparts greater flexibility and adhesion properties to the composition than is obtained when the reactive groups are on the phenyl nuclei.

One object of this invention is to provide new copolymers of monovinylidene aromatic compounds.

Another object is to provide copolymers of monovinylidene aromatic compounds wherein reactive groups are substituted on the backbone of the polymer molecule.

Another object is to provide reduced copolymers of monovinylidene aromatic compounds and alkyl vinyl ketones.

A further object is to provide processes for preparing such copolymers.

These and other objects are attained by reducing a copolymer of a monovinylidene aromatic compound and an alkyl vinyl ketone.

The following examples are given to illustrate the invention. Parts mentioned are parts by weight.

Example I

A reaction vessel is charged with a suspension of 5 parts of lithium aluminum hydride in 44 parts of tetrahydrofuran. A styrene-methyl vinyl ketone copolymer containing 60% by weight of styrene and having a molecular weight of about 30,000 is dissolved in tetrahydrofuran to form a solution of 3 parts of polymer in 44 parts of solvent. This solution is added with agitation to the suspension of lithium aluminum hydride under such conditions that the reaction mixture begins to reflux gently. When all of the polymer solution has been added, the reaction mixture is refluxed for an additional hour. The resultant polymer-lithium aluminum hydride complex is decomposed by pouring into ice water containing 10 parts of concentrated hydrochloric acid. The polymer is removed from the reaction mixture by filtration and dissolved in methyl ethyl ketone. This solution is added dropwise to water to reprecipitate the polymer. The process results in about 90% conversion to a fine white polymer. Infrared analysis shows that all of the carbonyl groups have been converted to hydroxyl groups. The product is molded between metal plates at about 105° C. under moderate pressure to yield a flexible article.

Example II

A styrene-methyl vinyl ketone copolymer containing 80% by weight of methyl vinyl ketone and having a molecular weight of about 25,000 is dissolved in tetrahydrofuran to form a solution of 5 parts of polymer in 44 parts of solvent. A reaction vessel is charged with this solution, and a suspension of 5 parts of lithium aluminum hydride in 44 parts of tetrahydrofuran is added to the solution with agitation under such conditions that the reaction mixture begins to reflux gently. When all of the lithium aluminum hydride suspension has been added, the reaction mixture is refluxed for an additional hour. The resultant polymer-lithium aluminum hydride complex is decomposed by pouring into water. The polymer is removed from the reaction mixture by filtration and dissolved in methyl ethyl ketone. This solution is added dropwise to water to reprecipitate the polymer. Infra-red analysis of the product shows that all of the carbonyl groups have been converted to hydroxyl groups. The product is dissolved in dioxane to form a solution of 50 parts of polymer in 50 parts of solvent. This solution is cast onto a glass plate to form a clear, flexible film.

The copolymers which are reduced to form the products of this invention are copolymers of monovinylidene aromatic compounds and alkyl vinyl ketones containing 1–99% by weight of the monovinylidene aromatic compound and, correspondingly, 99–1% by weight of alkyl vinyl ketone. These copolymers have molecular weights ranging from about 10,000–50,000 and may be prepared by conventional procedures, e. g., by mass, solution, or emulsion polymerization techniques. The monovinylidene aromatic component is a member of the group consisting of styrene, alpha-methyl styrene, and ar-substituted derivatives thereof wherein the ar-substituents may be halogens, hydroxyl groups, carboxyl groups, or aliphatic hydrocarbon radicals containing 1–4 carbon atoms. The alkyl vinyl ketone is one wherein the alkyl radical contains 1–5 carbon atoms. The alkyl vinyl ketone is one wherein the alkyl radical contains 1–5 carbon atoms. Mixtures of the monovinylidene aromatic compounds and mixtures of the alkyl vinyl ketones may be used in making the copolymers.

The monovinylidene aromatic compound-alkyl vinyl ketone copolymers may be reduced by the process used in the examples, i. e., by reduction with lithium aluminum hydride, or by any of the other conventional reduction techniques, e. g., by hydrogenation over metallic hydrogenation catalysts such as Raney nickel, copper-chromium oxide, etc. When the copolymers are reduced with lithium aluminum hydride, 1–3 mols of reducing agent are used per mol of combined alkyl vinyl ketone. The reaction is accomplished in a solvent for the copolymer such as tetrahydrofuran, dioxane, diethyl ether, benzene, etc., at reflux temperatures. The polymer-lithium aluminum hydride complex which is formed is decomposed by the use of a hydrolyzing agent, e. g., water, ethyl alcohol, ethyl acetate, etc.

The products of this invention are internally plasticized copolymers having hydroxyl groups substituted on the backbone of the polymer molecule. The number of hydroxyl groups in the reduced copolymers may be varied by varying the amount of alkyl vinyl ketone which is copolymerized with the monovinylidene aromatic compound. The reduced copolymers are soluble in common organic solvents such as higher alcohols, esters, ethers, ketones, hydrocarbons, amides such as dimethylformamide, tetrahydrofuran, etc.

Compositions containing the polymers of this invention may be modified by the incorporation of conventional additives such as dyestuffs, fillers, extenders, lubricants, etc. The polymers may be used alone or in combination with other polymeric materials, e. g., with other vinylidene polymers.

The polymers of this invention are useful in forming fibers, filaments, sheets, films, molding compositions, textile treating compositions, etc. They are particularly useful in coating compositions for various surfaces such as wood, paper, metal, textiles, etc. Coatings containing these polymers are characterized by good properties of flexibility and adherence.

The presence of the hydroxyl groups makes these polymers useful as precursors for further chemically modified polymers. For example, they may be reacted with polybasic acids or anhydrides to form alkyd-type resins.

It is obvious that many variations may be made in the products and processes set forth above without departing from the spirit and scope of this invention.

What is claimed is:

1. A reduced copolymer of an alkyl vinyl ketone wherein the alkyl radical contains 1-5 carbon atoms and a monovinylidene aromatic compound of the group consisting of styrene, alpha-methyl styrene, and ar-substituted derivatives thereof wherein the ar-substituent is a member of the group consisting of aliphatic hydrocarbon radicals containing 1-4 carbon atoms, halo, hydroxyl, and carboxyl substituents, said copolymer being reduced at the carbonyl groups to form hydroxyl groups.

2. A reduced copolymer as in claim 1 wherein the alkyl vinyl ketone is methyl vinyl ketone.

3. A reduced copolymer as in claim 1 wherein the monovinylidene aromatic compound is styrene.

4. A reduced copolymer as in claim 3 wherein the alkyl vinyl ketone is methyl vinyl ketone.

5. A process which consists of reacting lithium aluminum hydride at reflux temperatures with a copolymer of an alkyl vinyl ketone wherein the alkyl radical contains 1-5 carbon atoms and a monovinylidene aromatic compound of the group consisting of styrene, alpha-methyl styrene, and ar-substituted derivatives thereof wherein the ar-substituent is a member of the group consisting of aliphatic hydrocarbon radicals containing 1-4 carbon atoms, halo, hydroxyl, and carboxyl substituents.

References Cited in the file of this patent

UNITED STATES PATENTS 1,937,063    Meisenburg et al. _____ Nov. 28, 1933

OTHER REFERENCES

Noller: "Textbook of Organic Chemistry" (1951), page 164, published by W. B. Saunders Co., Philadelphia, Pa.

Adams et al.: "Organic Reactions" (1951), vol. VI, page 474, published by John Wiley & Sons, Inc., New York.

Gilman: "Organic Chemistry," vol. 1 (April 1953), pages 806-807, published by John Wiley & Sons, New York.